March 12, 1957    C. J. G. LEESEMANN    2,785,112
FRACTIONATION PROCESS
Filed Nov. 16, 1955
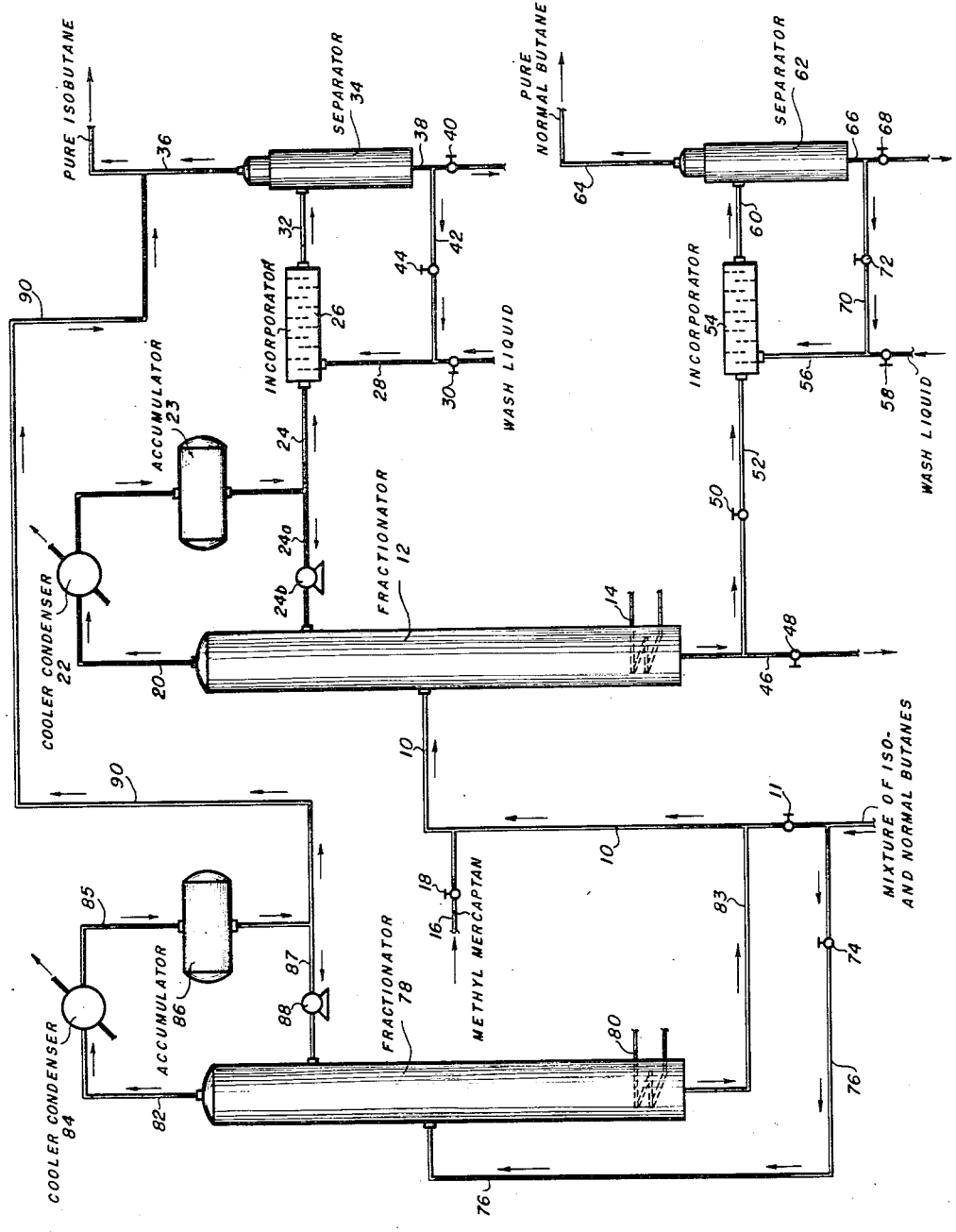
INVENTOR.
Charles J.G. Leesemann,
BY
ATTORNEY.

2,785,112

Patented Mar. 12, 1957

2,785,112

FRACTIONATION PROCESS

Charles J. G. Leesemann, Baytown, Tex., assignor, by mesne assignments, to Esso Research and Engineering Company, Elizabeth, N. J., a corporation of Delaware Application November 16, 1955, Serial No. 547,261

4 Claims. (Cl. 202—42)

This invention relates to a process for separating a mixture of normal and isobutanes into a susbtantially pure isobutane fraction and a substantially pure normal butane fraction. More particularly, the present invention is directed to an azeotropic distillation process for recovering substantially pure isobutane and substantially pure normal butane from a mixture of the same.

It is frequently desirable to separate a mixture of normal and isobutanes into a susbtantially pure isobutane fraction and a substantially pure normal butane fraction. Mixtures of normal and isobutanes are readily available and may be derived from a variety of sources such as, for example, from natural gasoline, from the fractional distillation of a petroleum crude oil, from the fractional distillation of the gaseous products obtained by the catalytic or thermal cracking of a petroleum gas oil fraction, by the catalytic Friedel-Crafts isomerization of normal butane, etc. Since normal butane boils at a temperature of about 1° C. and since isobutane boils at a temperature of about −11° C., a substantially complete separation of the two materials may be made by fractional distillation provided that a distillation column of at least about 60 theoretical plates is employed and that an amount of reflux to the column at least about 4 times that of the fresh feed to the column is employed.

However, distillation columns of this nature are expensive, involving a considerable capital outlay. Moreover, unless a distillation column of this nature is provided, incomplete separation between iso and normal butane results. If pure isobutane is to be obtained from a distillation column having less than the desired fractionating efficiency, it is at the sacrifice of yield with considerable amounts of the isobutane appearing in the normal butane fraction. When pure normal butane is desired, when using distillation towers of insufficient fractionating efficiency, normal butane yield is sacrificed and butane appears in the isobutane fraction in significant amounts.

From this it is seen that the susbtantially complete separation of a mixture of normal and isobutanes with conventional distillation apparatus presents a serious problem, particularly when a large scale separation is to be made.

Accordingly, an object of the present invention is the provision of a continuous process for separating a mixture of normal and isobutanes into a susbtantially pure isobutane fraction and a substantially pure normal butane fraction.

Another object is the provision of an azeotropic distillation process for separating a mixture of normal and isobutanes into a susbtantially pure isobutane fraction and a susbtantially pure normal butane fraction.

These and other objects are attained, in general, through the provision of a process wherein there is added to a mixture of normal and isobutanes at least about 1 mol of methyl mercaptan per 4.5 mols of isobutane, wherein the resultant mixture is fractionally distilled to provide an overheads azerotropic fraction consisting of a mixture of isobutane and methyl mercaptan boiling at a temperature of about −13° C. and a bottoms fraction comprising normal butane, and wherein the methyl mercaptan added prior to the distillation step is subsequently removed.

The present invention will be further illustrated by reference to the accompanying drawing wherein the single figure is a diagrammatic flow sheet illustrating a preferred manner in which the process of the present invention may be practiced.

Turning now to the drawing, the numeral 10 designates a charge line controlled by a valve 11 for charging a mixture of normal and isobutanes derived from any suitable source (not shown) to a fractional distillation column 12 which may be of any suitable construction; having, for example, a distillation efficiency equivalent to about 30 to 35 theoretical plates. Suitable heating means are provided for regulating the temperature and/or pressure in the distillation column 12 such as, for example, a steam coil 14. Distillation column 12 is provided with suitable internal vapor-liquid contacting means such as bell cap trays, packing, and the like.

There is also charged to the distillation column 12 at least about 1 mol of methyl mercaptan per 4.5 mols of isobutane in the feed mixture. This may be accomplished, for example, by introducing the desired amount of methyl mercaptan into the charge line 10 by way of a feed line 16 controlled by a valve 18.

Within the distillation column 12 the charge mixture is fractionated into an overhead vaporized fraction boiling at a temperature of about −13° C. and consisting substantially of isobutane and methyl mercaptan which is discharged through an overhead line 20 containing a suitable means such as a condenser and cooler 22 for liquefying the overhead fraction. From condenser and cooler 22 the overhead fraction is discharged into a reflux accumulator 23. From reflux accumulator 23, the liquid fraction is discharged in part by line 24 and in part by line 24a containing pump 24b back into tower 12 to serve as reflux therein. About 4 volumes or more of overheads per volume of feed is returned to the tower 12 through the line 24a as reflux. Preferably, the tower 12 is operated to provide from about 4 to about 5 volumes of reflux per volume of feed.

The liquefied overhead fraction in line 24 is then processed to remove the methyl mercaptan from the isobutane. This may be accomplished in any suitable manner such as, for example, through the provision of a water wash step, a caustic wash step, etc. for selectively removing methyl mercaptan from the overhead fraction. By way of example, the liquefied overhead fraction discharged from cooler 22 through line 24 is led to an incorporator 26 of any suitable construction, such as a baffle type incorporator. There is also charged to the incorporator 26 an appropriate amount of a washing liquid such as water or caustic which is charged thereto through a charge line 28 controlled by a valve 30. Within the incorporator 26 the wash liquid and liquefied overhead fraction are brought into intimate contact whereby the methyl mercaptan is incorporated into the wash liquid.

The resultant mixture is discharged from the incorporator 26 through a line 32 leading to a suitable means such as a separator 34 for separating the wash liquid from the thus purified isobutane. Substantially pure (e. g., 99.9% pure) isobutane is discharged from the separator 34 by way of a line 36 and the spent wash liquid is discharged from the separator 34 by way of a line 38 controlled by a valve 40. It is frequently desirable to recycle all or a part of the spent wash liquid and for this purpose there may be provided a recycle line 42 controlled by a valve 44 leading from the wash discharge line 38 to the wash charge line 28.

The bottoms fraction from the distillation zone 12 is discharged therefrom through a line 46 controlled by a valve 48. If substantially about 4.5 mols of methyl mercaptan per mol of isobutane was initially charged to the distillation zone 12, the bottoms fraction may consist essentially of substantially pure normal butane which may be discharged as product through the line 46.

However, it is generally preferable to employ at least a slight excess of methyl mercaptan and in this instance the bottoms normal butane fraction may also contain at least a residual amount of methyl mercaptan. In this situation, the valve 48 is preferably closed and a valve 50 in a side delivery line 52 is opened whereby the bottoms fraction may be charged to suitable means for removing the methyl mercaptan therefrom.

Thus, for example, the bottoms fraction may be charged by way of the line 52 to a suitable incorporator 54 wherein it is brought into intimate contact with a suitable wash liquid such as water, caustic, etc. The wash liquid is charged to the incorporator 54 through a charge line 56 controlled by a valve 58. The thus treated bottoms fraction is discharged from the incorporator 54 by way of a line 60 leading to a suitable means such as a separator 62 for separating the normal butane from the wash liquid. Substantially pure (e. g., 99.9% pure) normal butane is discharged from the separator 62 by way of a line 64 and spent contact liquid is discharged from the separator 62 by way of a discharge line 66 controlled by a valve 68. Provision may be made for recycling all or a portion of the spent wash liquid as, for example, by providing a recycle wash line 70 controlled by a valve 72 leading from the discharge line 66 to the wash charge line 56.

When the initial mixture of normal and isobutanes to be fractionated contains more than about 60 volume percent of isobutane it may be desirable in the interest of efficiency to precede the above described azeotropic distillation process with a conventional fractional distillation process in order to provide an overhead fraction consisting of substantially pure isobutane (i. e., a fraction containing at least about 99 volume percent and, preferably, 99.9 volume percent of isobutane). In this situation, the bottoms fraction may consist essentially of normal butane but will normally contain about 25 to 30 volume percent or more of isobutane. When this procedure is followed, the bottoms fraction from the initial conventional distillation is employed as the charge stock for the above described azeotropic distillation process.

By way of example, and assuming that the butanes mixture contains more than about 60 volume percent of isobutane, the valve 11 in the charge line 10 may be closed and a valve 74 in a feed line 76 leading to a conventional fractionating column 78 may be opened whereby the butanes mixture will be initially charged to the distillation column 78. It will be understood that the column 78 will be of any suitable construction, similar to that of column 12, will have a distillation efficiency equivalent to about 30 to 35 theoretical plates, will be provided with suitable means for controlling distillation temperature and/or pressure such as a steam coil 80, and will be provided with suitable internal vapor-liquid contacting means.

Within the distillation column 78 the mixture of butanes is fractionated to provide a vaporized overhead fraction boiling at about −11° C. which is discharged therefrom by way of an overheads line 82 and a bottoms fraction comprising a mixture of normal and isobutane which is discharged by way of a bottoms line 83 leading to the charge line 10 for the azeotropic distillation column 12.

The vaporized overheads from distillation column 78, consisting essentially of isobutane, is charged by way of the line 82 to suitable means such as a condenser and cooler 84 for liquefaction. The liquefied overheads from the condenser and cooler 84 is charged by way of a line 85 to an accumulator 86. From the reflux accumulator 86 the liquid fraction is discharged in part by a line 87 containing a pump 88 back to the tower 78 as reflux and in part by way of a line 90 to the isobutane discharge line 36.

The invention may be illustrated by the following example:

*Example 1*

Add to a mixture of isobutane and normal butane containing approximately 33% by volume of isobutane and 67% by volume of normal butane 1 mol of methyl mercaptan per 4.5 mols of isobutane. Distill the methyl mercaptan-containing mixture in a fractionation tower having a distillation efficiency of about 35 theoretical plates employing a reflux ratio of about 4 volumes of reflux per volume of feed. An azeotropic mixture boiling at −13° C. is recovered overhead containing approximately 17.5 mol percent of isobutane. Recover substantially pure isobutane from the azeotropic mixture by washing the same with water. The bottoms fraction from the azeotropic distillation consists essentially of normal butane and a minor amount of methyl mercaptan removable by a water wash.

What is claimed is:

1. A process for recovering substantially pure isobutane and substantially pure normal butane from a mixture of such butanes which comprises adding to said mixture at least about 1 mol of methyl mercaptan per 4.5 mols of isobutane and distilling the thus formed mixture to provide an overheads fraction consisting of isobutane and methyl mercaptan and a bottoms fraction comprising normal butane, and subsequently removing the methyl mercaptan.

2. A process for recovering substantially pure isobutane and substantially pure normal butane from a mixture of normal butane and isobutane containing not more than about 60 volume percent of isobutane, said process comprising the steps of adding to said mixture at least about 1 mol of methyl mercaptan per 4.5 mols of isobutane and distilling the thus formed mixture to provide an overheads fraction consisting of isobutane and methyl mercaptan and a bottoms fraction comprising normal butane, and subsequently removing the methyl mercaptan.

3. A process for recovering substantially pure isobutane and substantially pure normal butane from a mixture of normal butane and isobutane containing more than about 60 volume percent of isobutane, said process comprising the steps of fractionally distilling said feed stock to provide an overhead fraction consisting essentially of pure isobutane and a bottoms fraction comprising normal and isobutane, adding at least about 1 mol of methyl mercaptan per 4.5 mols of isobutane to said bottoms fraction, distilling the thus formed mixture to provide an overhead fraction consisting of isobutane and methyl mercaptan and a bottoms fraction comprising normal butane, and subsequently removing the methyl mercaptan.

4. A process as in claim 3 wherein the methyl mercaptan is removed from said fraction containing the same by contacting said fraction with a wash liquid.

References Cited in the file of this patent

"Azeotrope Formation Between Thiols and Hydrocarbons" by Denyer et al., published in Industrial and Engineering Chemistry, December 1949, vol. 41, No. 12, pp. 2727–2737.